(12) United States Patent
Sakka

(10) Patent No.: US 9,071,641 B2
(45) Date of Patent: Jun. 30, 2015

(54) MAPPING SYSTEM THAT DISPLAYS NEARBY REGIONS BASED ON DIRECTION OF TRAVEL, SPEED, AND ORIENTATION

(75) Inventor: Noriyuki Sakka, Tokyo (JP)

(73) Assignee: BIGLOBE INC., Tokyo (JP)

( * ) Notice: Subject to any disclaimer, the term of this patent is extended or adjusted under 35 U.S.C. 154(b) by 518 days.

(21) Appl. No.: 12/923,608

(22) Filed: Sep. 29, 2010

(65) Prior Publication Data

US 2011/0078238 A1 Mar. 31, 2011

(30) Foreign Application Priority Data

Sep. 30, 2009 (JP) ................................. 2009-226611

(51) Int. Cl.
G06F 15/16 (2006.01)
H04L 29/08 (2006.01)
H04W 4/02 (2009.01)

(52) U.S. Cl.
CPC ............... *H04L 67/18* (2013.01); *H04W 4/026* (2013.01); *H04W 4/028* (2013.01)

(58) Field of Classification Search
CPC .............................. H04W 4/026; H04W 4/028
USPC .................................................. 701/455, 461
See application file for complete search history.

(56) References Cited

U.S. PATENT DOCUMENTS

| 5,317,515 A * | 5/1994 | Matsuzaki ..................... 701/472 |
| 5,897,603 A * | 4/1999 | Henderson ..................... 701/538 |
| 6,320,579 B1 * | 11/2001 | Snyder et al. ................. 345/419 |
| 6,321,158 B1 * | 11/2001 | DeLorme et al. ............. 701/426 |
| 6,515,614 B2 * | 2/2003 | Sakai et al. ....................... 342/70 |
| 6,553,308 B1 * | 4/2003 | Uhlmann et al. ............. 701/455 |
| 7,218,245 B2 * | 5/2007 | Wyatt et al. .................... 340/973 |
| 7,689,326 B2 * | 3/2010 | He ..................................... 701/3 |
| 7,957,858 B1 * | 6/2011 | Larson et al. .................. 701/23 |
| 8,180,567 B2 * | 5/2012 | Geelen et al. ................. 701/431 |
| 8,275,834 B2 * | 9/2012 | Aldunate et al. .............. 709/204 |
| 2004/0167714 A1 * | 8/2004 | Macphail ...................... 701/213 |

(Continued)

FOREIGN PATENT DOCUMENTS

| JP | 8-147593 A | 6/1996 |
| JP | 2002-304408 A | 10/2002 |

(Continued)

OTHER PUBLICATIONS

Machine translation of JP 2002-304408.*

(Continued)

*Primary Examiner* — Jeffrey R Swearingen
*Assistant Examiner* — Benjamin A Jenkins
(74) *Attorney, Agent, or Firm* — McGinn IP Law Group, PLLC

(57) ABSTRACT

An information providing system includes a terminal and a server. The information providing system includes: an information database configured to record registration data in relation to position data; a position data acquiring section configured to acquire a position data of the terminal; a state acquiring section configured to acquire a state data indicative of a state of the terminal; and a region determining section configured to determine a specified retrieval region of the registration data based on the state data. An information extracting section is configured to extract the registration data in the specified retrieval region from the information database as browser data, and a display section is configured to display the browser data.

22 Claims, 15 Drawing Sheets

(56) References Cited

U.S. PATENT DOCUMENTS

| | | | |
|---|---|---|---|
| 2004/0260461 A1* | 12/2004 | Sato et al. | 701/207 |
| 2005/0027420 A1* | 2/2005 | Fujishima et al. | 701/50 |
| 2005/0137788 A1* | 6/2005 | Kimura | 701/201 |
| 2007/0083323 A1* | 4/2007 | Rosenberg | 701/200 |
| 2007/0179684 A1* | 8/2007 | He | 701/3 |
| 2007/0225904 A1* | 9/2007 | Pantalone et al. | 701/207 |
| 2008/0319654 A1* | 12/2008 | Shintani et al. | 701/208 |
| 2009/0319175 A1* | 12/2009 | Khosravy et al. | 701/206 |
| 2009/0319181 A1* | 12/2009 | Khosravy et al. | 701/208 |
| 2009/0325607 A1* | 12/2009 | Conway et al. | 455/456.3 |
| 2010/0042273 A1* | 2/2010 | Meunier et al. | 701/9 |
| 2010/0057344 A1* | 3/2010 | Nezu et al. | 701/201 |
| 2011/0054834 A1* | 3/2011 | Partridge et al. | 702/150 |

FOREIGN PATENT DOCUMENTS

| | | |
|---|---|---|
| JP | 2005-252941 A | 9/2005 |
| JP | 2007-234056 A | 9/2007 |
| WO | WO 02/059716 A2 | 8/2002 |
| WO | WO 2007/010754 A1 | 1/2007 |

OTHER PUBLICATIONS

Japanese Office Action dated Oct. 18, 2011, with partial English translation.

Japanese Office Action dated May 18, 2011, with partial English translation.

* cited by examiner

Fig. 2
| | (1) ELLIPSE AREA | (2) FAN SHAPE |
|---|---|---|
| RUNNING STATE | 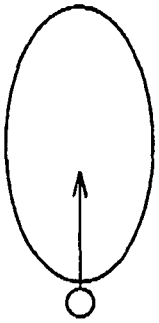 | 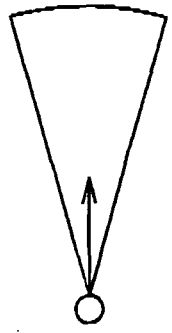 |
| BRISK WALKING STATE | 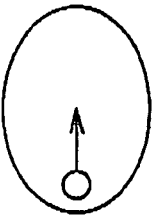 | 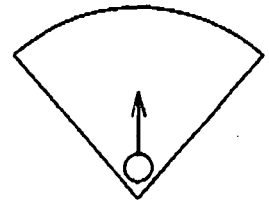 |
| WALKING STATE | 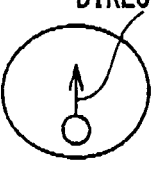 TERMINAL MOVEMENT DIRECTION | 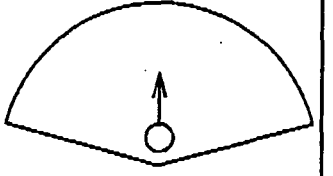 |
| STOP STATE | 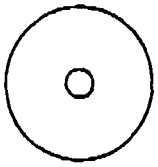 | 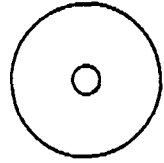 |

Fig. 3

REGION TABLE

| TERMINAL SPEED | EQUAL TO OR MORE THAN 0 KM/H AND LESS THAN 4 KM/H | EQUAL TO OR MORE THAN 4 KM/H AND LESS THAN 10 KM/H | 10 KM/H OR MORE |
|---|---|---|---|
| REGION DATA | MOVEMENT DIRECTION: +100M<br>BACKWARD DIRECTION: +100M<br>RIGHT DIRECTION: +100M<br>LEFT DIRECTION: +100M | MOVEMENT DIRECTION: +300M<br>BACKWARD DIRECTION: +20M<br>RIGHT DIRECTION: +50M<br>LEFT DIRECTION: +50M | MOVEMENT DIRECTION: +500M<br>BACKWARD DIRECTION: -50M<br>RIGHT DIRECTION: +10M<br>LEFT DIRECTION: +10M |

Fig. 4

| ID | SECTION | SUBSECTION | NAME | LINK DESTINATION | POSITION DATA |
|---|---|---|---|---|---|
| . | . | . | . | . | . |
| . | . | . | . | . | . |
| . | . | . | . | . | . |
| 246 | RESTAURANT | RAMEN SHOP | aaa HOUSE | http://www.aaa.... | (x1, y1) |
| 247 | RESTAURANT | RAMEN SHOP | bb HOUSE | http://www.aaa.... | (x2, y2) |
| 250 | RESTAURANT | PASTRY SHOP | ccc | http://www.aaa.... | (x3, y3) |
| 251 | RESTAURANT | PASTRY SHOP | ddd | http://www.aaa.... | (x4, y4) |
| 252 | RESTAURANT | COFFEE SHOP | aaa CAFETERIA | http://www.aaa.... | (x5, y5) |
| 253 | RESTAURANT | COFFEE SHOP | COFFEE SHOP bb | http://www.aaa.... | (x6, y6) |
| . | . | . | . | . | . |
| . | . | . | . | . | . |
| . | . | . | . | . | . |

Fig. 12
| | (1) ELLIPSE AREA | (2) FAN SHAPE |
|---|---|---|
| RUNNING STATE | 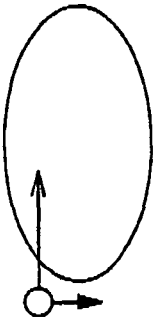 | 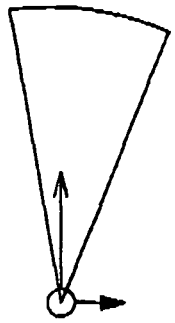 |
| BRISK WALKING STATE |  | 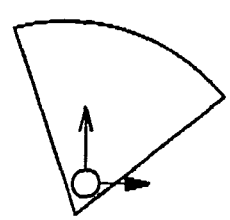 |
| WALKING STATE | TERMINAL MOVEMENT DIRECTION 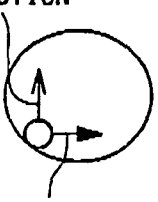 TERMINAL ORIENTATION | 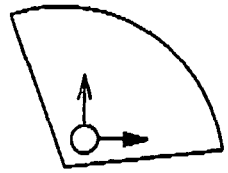 |
| STOP STATE | 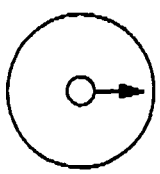 | 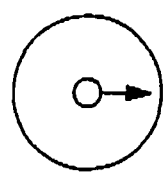 |

Fig. 13

| ADDITIONAL PARAMETER TABLE ||
|---|---|
| SPEED | All STATES |
| REGION DATA | TERMINAL ORIENTATION: +20m |

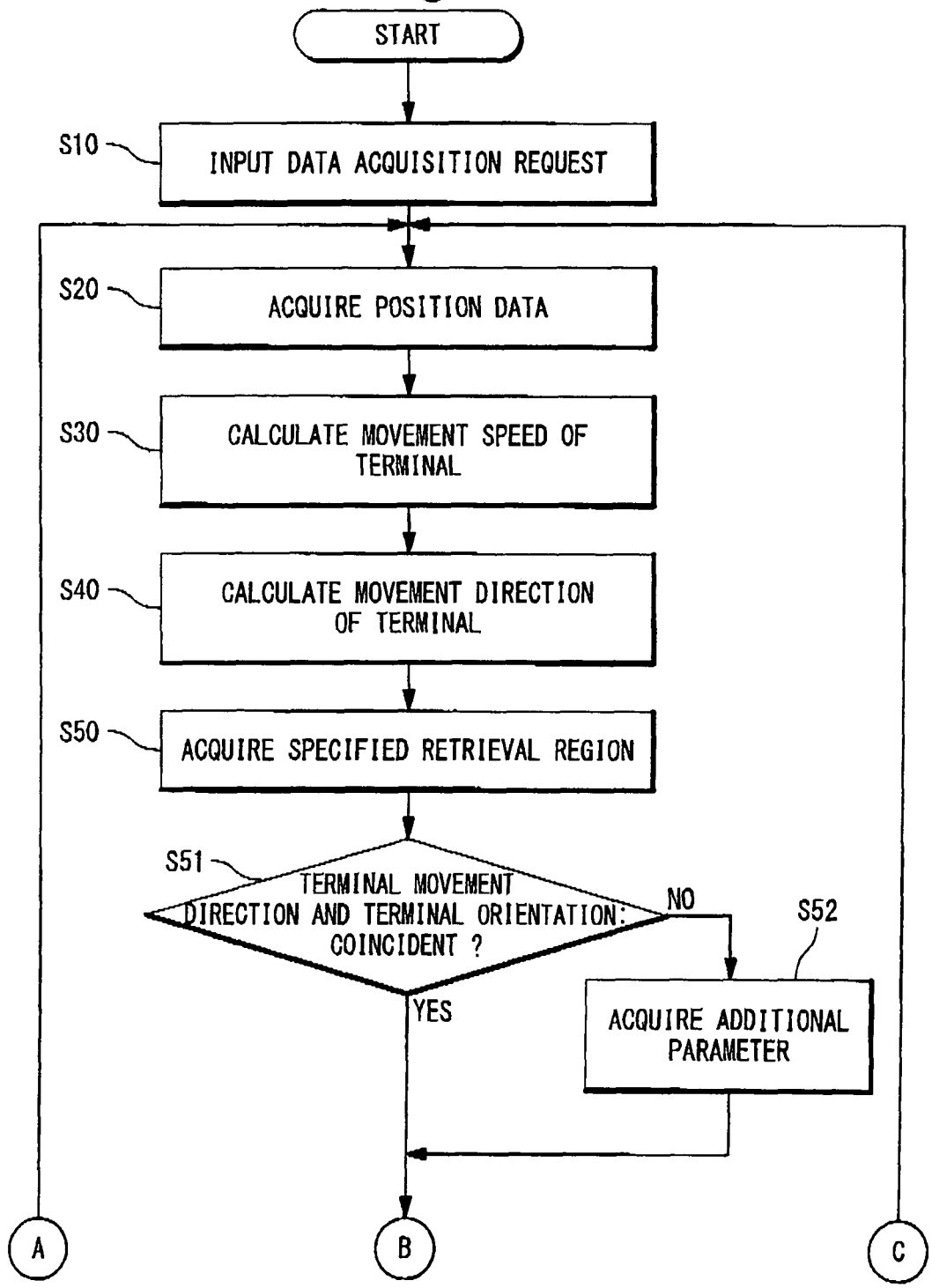

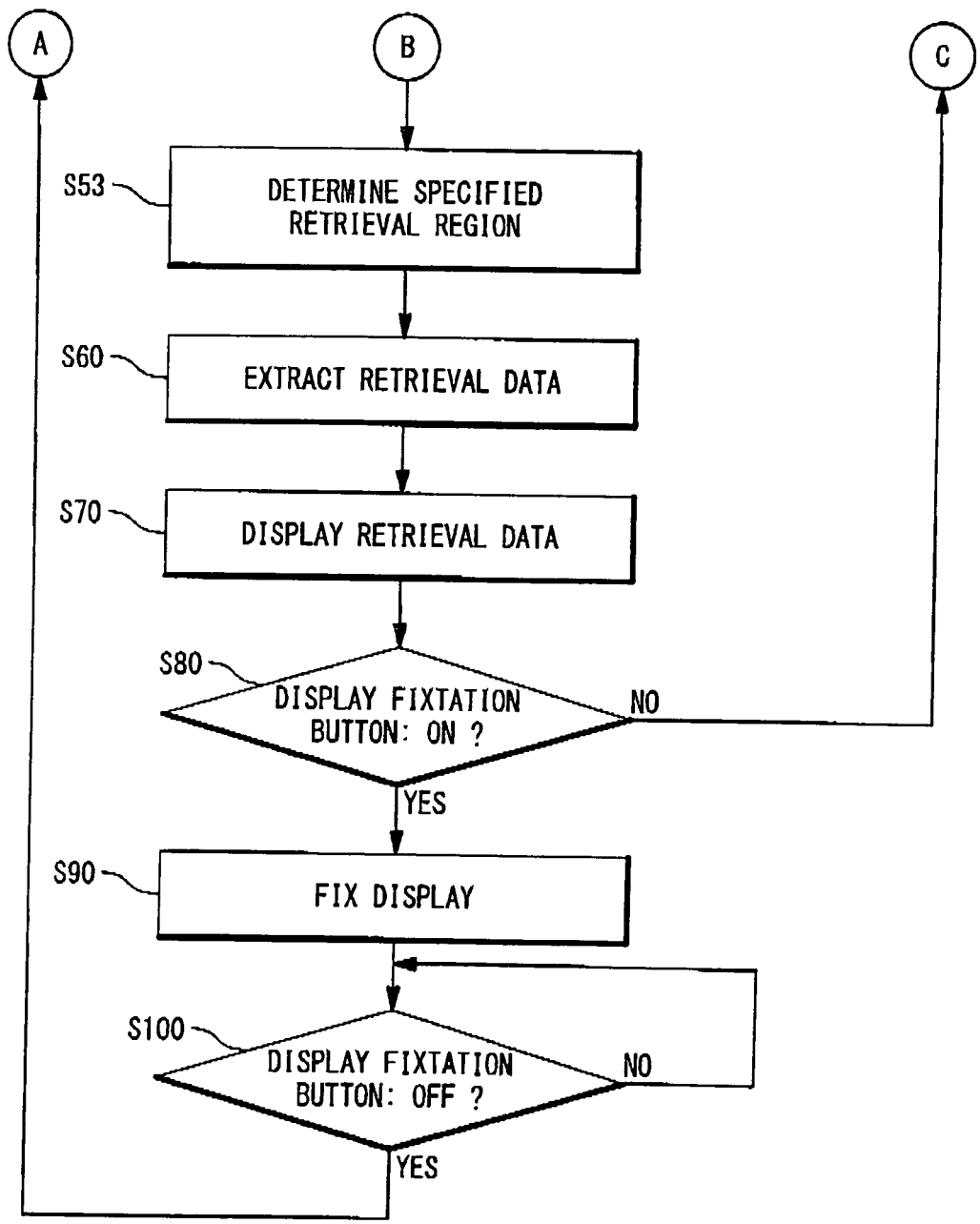

US 9,071,641 B2

MAPPING SYSTEM THAT DISPLAYS NEARBY REGIONS BASED ON DIRECTION OF TRAVEL, SPEED, AND ORIENTATION

INCORPORATION BY REFERENCE

This patent application claims a priority on convention based on Japanese Patent Application No. 2009-226611 filed on Sep. 30, 2009. The disclosure thereof is incorporated herein by reference.

TECHNICAL FIELD

The present invention relates to an information providing system for displaying data of a peripheral area of a terminal.

BACKGROUND ART

An information providing system is known which provides data of a peripheral area of a terminal, based on a current position of the terminal. The information providing system is usually provided with the terminal for obtaining position data and a server for providing the data. The server extracts a peripheral data satisfying a retrieval condition by a user of the terminal from pre-registered data, by receiving the position data of the terminal, and transmits the extracted peripheral data to the terminal. Thus, the user can know the peripheral data from a display on the terminal. Such a service is required to extract and provide a data, which is beneficial for the user, from an enormous amount of data.

Patent Literature 1 discloses an automatic retrieval system for a traffic data provision range for automatically retrieving a range of a traffic data to be transmitted to a terminal and producing the traffic data of the retrieved range quickly and accurately. The automatic retrieval system of the Patent Literature 1 is provided with a traffic control network storing section; a range setting section, a candidate link acquiring section; a determining section, and a traffic data retrieving section. The traffic control network storing section stores links of a traffic control network. The range setting section inputs a direction, an angle and a provision distance, and sets a provision region. The candidate link acquiring section acquires the links of candidates from the traffic control network storing section. The determining section determines whether or not the links of the candidates belong to the provision range. The traffic data retrieving section retrieves the traffic data corresponding to the links that belong to the provision range. According to the automatic retrieval system for the traffic data provision range in the Patent Literature 1, since the traffic data managed in the traffic control network can be retrieved in a desirable range, the traffic data can be produced accurately and quickly.

In the Patent Literature 1, a data to be provided is determined on the basis of whether or not a total of distances of the links preset along roads falls within a preset provision distance. Thus, the data cannot be extracted on the basis of the state of the terminal.

Also, a technique for using a position data to perform data provision is disclosed in Patent Literature 2.

CITATION LIST

[Patent Literature 1]: JP-A-Heisei, 8-147593
[Patent Literature 2]: WO02/059716

SUMMARY OF THE INVENTION

A subject matter of the present invention is to attain an information providing system that can provide data in a proper region to a terminal based on a state of a terminal.

In an aspect of the present invention, an information providing system includes a terminal and a server. The information providing system includes: an information database configured to record registration data in relation to position data; a position data acquiring section configured to acquire a position data of the terminal; a state acquiring section configured to acquire a state data indicative of a state of the terminal; a region determining section configured to determine a specified retrieval region of the registration data based on the state data; an information extracting section configured to extract the registration data in the specified retrieval region from the information database as browser data; and a display section configured to display the browser data.

In another aspect of the present invention, an information providing method, in an information providing system including a terminal and a server, is achieved by storing registration data in relation to a position data; by acquiring the position data of the terminal; by acquiring a state data indicative of a state of the terminal; by determining a specified retrieval region based on the state data, wherein the specified retrieval region is changed based on the state data; by extracting browser data from the registration data based on the specified retrieval region; and by displaying the browser data.

According to the present invention, it is possible to attain the information providing system that can provide the data in the proper region to the terminal based on the state of the terminal.

BRIEF DESCRIPTION OF THE DRAWINGS

The above and other objects, advantages and features of the present invention will be more apparent from the following description of certain embodiments taken in conjunction with the accompanying drawings, in which:

FIG. 2 is a diagram showing a policy of specifying a retrieval region in the first preferred embodiment;

FIG. 3 shows an example of a region table in the first preferred embodiment;

FIG. 4 is a diagram showing an example of an information database in the first preferred embodiment;

FIG. 12 is a diagram showing a policy of specifying a retrieval region in the second preferred embodiment;

FIG. 13 shows an example of an additional parameter table in the second preferred embodiment;

FIGS. 15A and 15B are a control flow of providing browser data to the terminal in the second preferred embodiment.

DESCRIPTION OF PREFERRED EMBODIMENT

Hereinafter, an information providing system according to the present invention will be described in detail with reference to the attached drawings.

First Preferred Embodiment

At first, the information providing system according to a first preferred embodiment of the present invention will be described.

Figure 1:
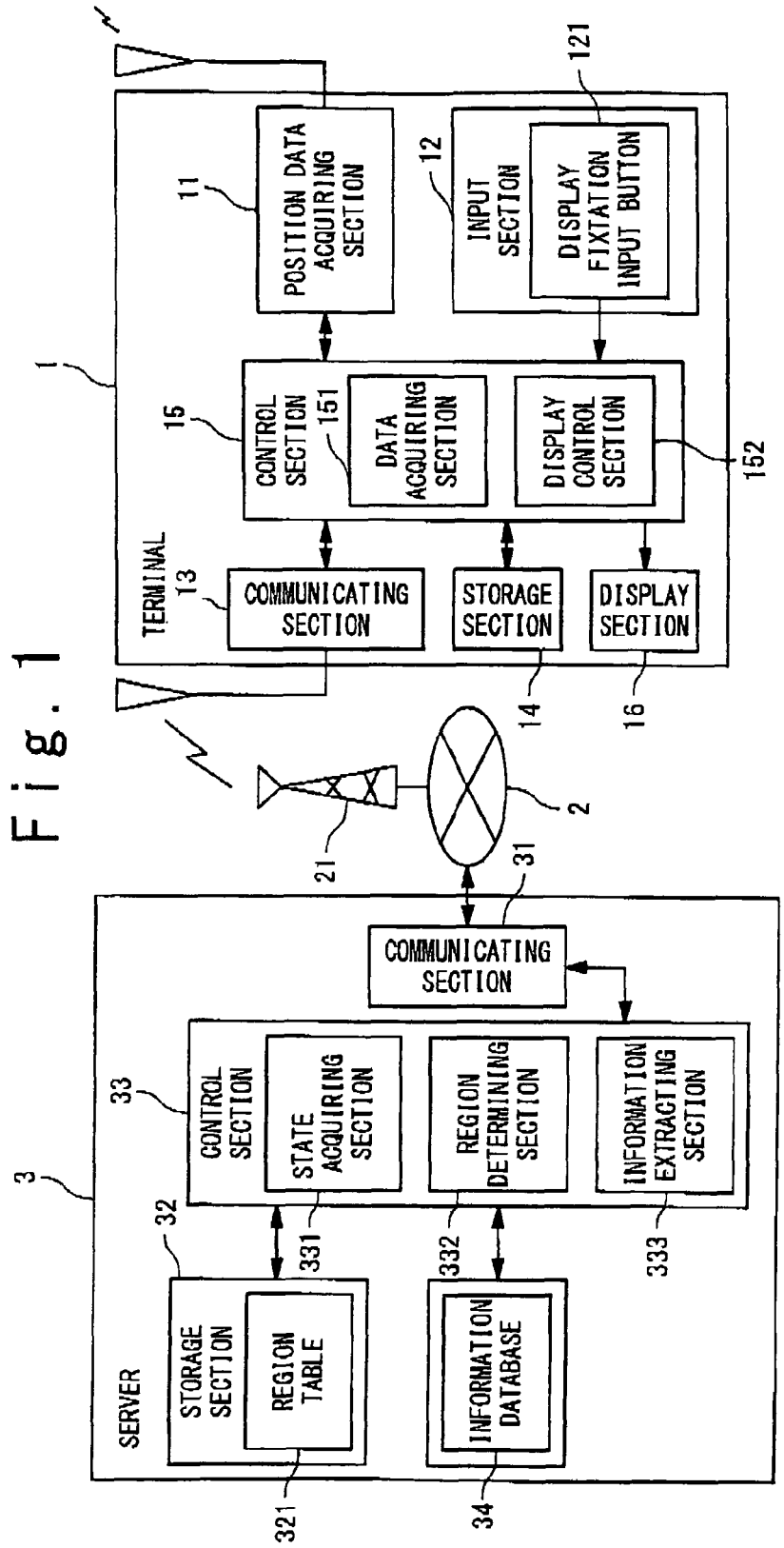
FIG. 1 is a block diagram showing a configuration of an information providing system according to a first preferred embodiment of the present invention.

At first, the configuration of the information providing system in the preferred embodiment will be described. FIG. 1 is a block diagram showing the configuration of the information providing system in the preferred embodiment.

The information providing system in the preferred embodiment is provided with a terminal 1, network 2 and a server 3.

In the information providing system in the preferred embodiment, the server records retrieval regions in a database in advance. The terminal periodically acquires a position data to transmit to the server. The server calculates a movement speed of the terminal in accordance with the position data received from the terminal and specifies one of the retrieval regions recorded in the database based on the movement speed. The server extracts browser data in the specified retrieval region from an information database, and transmits the extracted data to the terminal.

At first, the terminal 1 will be described. The terminal 1 is a mobile phone terminal used by a user. The terminal 1 can communicate with the server 3 through the network 2. The terminal 1 can acquire a current position data. The terminal 1 transmits the current position data to the server 3 and acquires a retrieval data to be browsed by the user from the server 3 and displays the data as browser data. It should be noted that the preferred embodiment will be described under the assumption that the terminal 1 is the mobile phone terminal. However, the terminal 1 is not limited to the mobile phone terminal. The present invention can be widely applied to information equipment of an information display terminal such as a PDA (Personal Digital Assistant), a note type personal computer, a game machine, and a car navigation terminal, and a wearable computer including eyeglasses with an information displaying function, and a head mount display, or an information terminal installed in a car, and a bicycle.

The terminal 1 is provided with a position data acquiring section 11, an input section 12, a communicating section 13, a storage section 14, a control section 15 and a display section 16. The respective sections will be described below.

At first, the position data acquiring section 11 acquires a position data of the terminal 1. The position data acquiring section 11 is connected to the control section 15 and can transmit and receive a data to and from the control section 15. The position data acquiring section 11 is provided with an antenna and receives electromagnetic wave from a GPS satellite to calculate the position of the terminal 1. It should be noted that in the preferred embodiment, the position data will be described under the assumption that it includes data indicating a latitude and a longitude. However, the position data may include a data indicating a height.

In the preferred embodiment, the position data acquiring section 11 of the terminal 1 acquires the position of the terminal 1 from GPS satellite. However, the method of acquiring the position of the terminal 1 is not limited to this. For example, a method of acquiring the position of the terminal 1, in accordance with the reception electric field intensities of electromagnetic waves emitted from base stations in a mobile communication network is adopted or an alternate method may be used.

Next, the input section 12 is an input interface to the user of the terminal 1. The input section 12 is configured of a numeric keypad or a touchpad. The input section 12 is connected to the control section 15 and outputs the input from the user to the control section 15. The input section 12 is provided with a display fixtation button 121. The display fixtation button 121 is a button for fixing data displayed on the display section 16. When the display fixtation button 121 is set to "ON", the display data is fixed, and when it is set to "OFF", the fixtation of the display data is released. It should be noted that the display fixtation button 121 may be attained in hardware of the input section 12, such as an input button or a sensor switch. Otherwise, it may be attained in software so that the button is selected from buttons displayed on the display section 16, based on an input to the input section 12. The display fixtation button 121 is not limited to the above examples. Various techniques that can fix data displayed on the display section 16, or can input a command for releasing the fixtation.

Next, the communicating section 13 communicates the server 3 through the network 2. The communicating section 13 is connected to the control section 15 and can communicate with the control section 15. The communicating section 13 is provided with an antenna for radio communication. The communicating section 13 can access the network 2 by a radio communication and carry out communication with a communication protocol used in the network 2.

Next, the storage section 14 is configured by RAM (Random Access Memory) and ROM (Read Only Memory). The storage section 14 stores a processing program for attaining functions of the terminal 1 and various data. The storage section 14 is connected to the control section 15 and can transmit and receive the data to and from the control section 15. It should be noted that the processing program stored in the storage section 14 is loaded from an external storage medium (not shown). Here, the storage medium is exemplified as CD (Compact Disc), a small flash memory device, and a hard disc of an application provision server. In this case, the processing program is installed from the above storage medium to the storage section 14.

Next, the control section 15 is configured from a CPU (Central Processing Unit). The control section 15 performs the functions of the terminal 1 by reading and executing the processing program stored in the storage section 14. The control section 15 is provided with the information acquiring section 151 and the display control section 152 to be described below.

At first, the information acquiring section 151 transmits a data request through the communicating section 12 to the server 3. The data request includes a retrieval keyword of a data to be browsed by the user; the position data calculated by the position data acquiring section 11; an acquisition time of the position data; and an identification data of the terminal 1. The information acquiring section 151 acquires the retrieval data from the server 3.

Next, the display control section 152 controls data display on the display section 16. The display control section 152 displays on the display section 16, the retrieval data acquired from the server 3 by the information acquiring section 151. When the user turns ON the display fixtation button 121 of the input section 12, the display control section 152 fixes the data displayed on the display section 16. On the other hand, when the user turns OFF the display fixtation button of the input section 12, the display control section 152 releases the fixtation of the data displayed on the display, section 16.

Next, the display section 16 is configured from an LCD (Liquid Crystal Display). The display section 16 is connected to the control section 15 and displays data sent from the display control section 152. It should be noted that the display section 16 may be configured from a display device other than the LCD.

The network 2 will be described below. The network 2 transfers data between the terminal 1 and the server 3. In the preferred embodiment, the network 2 is a mobile communication network. The network 2 is provided with a radio base station 21 and carries out a radio communication with the terminal 1. Since the mobile communication network is well known, its further description is omitted. It should be noted that the preferred embodiment will be described under an assumption that the network 2 is the mobile communication network. However, the network 2 is not limited to the mobile communication network. A wide application is possible which includes a high speed radio communication network based on a technique such as a radio LAN (Local Area Network) or WiMAX (WorldWide Interoperability for Microwave Access), and a communication network such as the Internet, a dedicated line network or a combination of them. In that case, a radio communication method performed by the terminal 1 is based on the radio communication method of the network 2.

The server 3 will be described below. The server 3 is provided with a communicating section 31, a storage section 32, a control section 33 and an information database 34.

The server 3 provides the retrieval data to the terminal 1. The server 3 can communicate with the terminal 1 through the network 2. The server 3 records various data (hereinafter, to be referred to as registration data) to be browsed by the user. When receiving the data request from the terminal 1, the server 3 determines a range of the registration data (hereinafter, to be referred to as a specified retrieval region) from which the retrieval data to be transmitted to the terminal 1 is extracted, in accordance with the position data included in the data request. The server 3 extracts the data in the determined specified retrieval region and transmits to the terminal 1.

The respective configurations will be described below. At first, a communicating section 31 is connected to the network 2 and a control section 33 and communicates data with the terminal 1 through the network 2, and with the control section 33.

Next, a storage section 32 is configured by RAM (Random Access Memory), ROM (Read Only Memory) and a hard disc. The storage section 32 stores a processing program for attaining functions of the server 3, and various data. It should be noted that the processing program stored in the storage section 32 can be recorded in the external storing medium (not shown). Here, the storing medium is exemplified as a CD, a small flash memory device, and a hard disc of the application provision server. In this case, the processing program is installed from the foregoing storing medium into the storage section 32. The storage section 32 is connected to the control section 33 and can communicate with the control section 33. The storage section 32 is provided with a region table 321. The region table 321 will be described below.

The region table 321 stores retrieval regions in relation to the state of the terminal 1 and the retrieval regions are set physically on a map. The retrieval data is extracted in association with a specified one of the retrieval regions.

A policy of setting the retrieval regions in the preferred embodiment will be described below with reference to FIG. 2. FIG. 2 is a diagram showing the policy for setting the retrieval region in the preferred embodiment. In the preferred embodiment, one of the retrieval regions is determined and specified on the basis of the state of the terminal 1. In the preferred embodiment, the state of the terminal 1 includes a movement direction and a movement speed. The region table 321 stores the retrieval regions in relation to the movement speed of the terminal 1. FIG. 2 shows two of a case (1) in which an ellipse is used to specify the retrieval region and a case (2) in which a fan shape is used to specify the retrieval region. Each of them is related to the movement speed that indicates the state of the terminal 1 (in short, the state of the user having the terminal 1 or the car containing the terminal 1). The region table 321 stores retrieval regions for four states of a stop state, a walking state, a brisk walking state and a running state, as the states corresponding to the movement speed of the terminal 1.

A case in which an ellipse is used to specify the retrieval region will be described as an example. At first, in a case that the terminal 1 is in the stop state, a region of a circle having a constant radius (for example, r) with a location of the terminal 1 having as a center of the circle is assumed to be the retrieval region. For example, in a case that the terminal 1 is moving and the movement speed of the terminal 1 is the walking speed, the retrieval region becomes the circular region of the radius r, in which the center of the circle moves in the movement direction of the terminal 1. In short, the retrieval region is set wide in the movement direction of the terminal 1. A region in a backward direction opposite to the movement direction of the terminal 1 is set narrow. This is because the user of the terminal 1 would require data in the movement direction since the terminal 1 is moving in the movement direction, and also this is because the user would not require the data in the backward direction from the center so much.

It should be noted that in this case, as shown in FIG. 2, the retrieval region may be an ellipsoidal region in which a short axis (for example, a length r) is set in the movement direction and a long axis (for example, a length 1.5r) is set in a direction orthogonal to the movement direction. The terminal 1 is moving in the movement speed in the walking state. Thus, it is possible to assume a case that the user of the terminal 1 is moving without having any particular object. For this reason, it is considered that the retrieval region is set wide in right and left directions of the user, so that a large quantity of data are provided to the user. Such a correction of the retrieval region may be properly performed.

Next, when the terminal 1 is in the brisk walking state, the retrieval region has a shape of an ellipse whose long axis exists in the movement direction. At this time, a long diameter that is a length of the ellipse on the long axis is 2r and equal to two times of that in the walking state or the stop state. Also, similarly to the case of the walking state, the center of the ellipse is located in the backward direction opposite to the movement direction of the terminal 1. In short, the retrieval region is set further wide in the movement direction, as compared with the case of the walking state, and a region in the backward direction is set narrow.

Moreover, when the movement speed of the terminal 1 becomes high and the terminal 1 is moving in the running speed, the retrieval region is further extended in the movement direction and becomes the range of the ellipse in which the length on the long diameter is, for example, 4r. Also, the center of the ellipse is further located in the movement direction, as compared with the case of the brisk walking state. The retrieval region is set in a forward region without including the location of the terminal 1. In short, the retrieval region is set in a region at which the user of the terminal 1 will arrive from now and which does not include the vicinity of a current position of the terminal 1. This is because the user would require the data in the region in the movement direction at which the user will arrive from now when the user of the terminal 1 is in the running state.

In this way, in the preferred embodiment, as the movement speed of the terminal 1 becomes higher, the retrieval region is set wide in the movement direction. This is similar even in the case that a fan shape shown in (2) of FIG. 2 is used to specify the retrieval region. When the fan shape is used to specify the retrieval region, the radius of the circle for the fan shape is changed on the basis of the movement speed. For example, when the terminal 1 is moving in the walking speed, the radius of the circle is defined as r, and in the case of the brisk walking speed, the radius is defined as 2r, and in the case of the running speed, the radius is defined as 4r. Also, when the fan shape is used to specify the retrieval region, the central angle of the fan shape is made narrow on the basis of the movement speed of the terminal 1. For example, when the terminal 1 is in the walking state, the central angle is defined as 135° with the movement direction as the axis, and in the case of the brisk walking speed, the central angle is defined as 90° with respect to the movement direction, and in the case of the running state, the central angle is defined as 45° with respect to the movement direction.

This is because, as the movement speed of the terminal 1 becomes faster, a possibility that the terminal 1 moves in the movement direction becomes higher, and there is a possibility that data of the vicinity of the current position is required becomes lower. In short, in the state that the user of the terminal 1 is slowly walking, there is a possibility that the user continues to move straightly in its original state and a possibility that the user turns right or left. Thus, the provision of data in a region in the right and left directions is considered to be meaningful. However, in the state that the user of the terminal 1 is in a running state in a certain direction, a possibility that the user moves in the movement direction becomes high. Thus, the provision of data in a region in the right and left directions is considered not to be meaningful so much. It should be noted that when the ellipse region is used to specify the retrieval region, the length of the short axis of the ellipse can be reduced, on the basis of the movement speed of the terminal 1.

It should be noted that in the preferred embodiment, although the ellipse and the fan shape are used for the retrieval region, the shape of the retrieval region is not limited to them. If it is along the policy for setting the region that becomes wide in the movement direction on the basis of the increase in the movement speed, various shapes may be applied to the shape of the retrieval region. Also, as mentioned above, a change of a coefficient such as the length of the long axis of the ellipse or the radius of the circle producing the fan shape depending on movement speed is exemplified, and it is not limited to them. Also, the states of the terminal are grouped into the stop state, the walking state, the brisk walking state and the running state. However, they are exemplified, and they, may be related to the actual movement speed (distance per hour).

The data recorded in the region table 321 will be described below in accordance with the above policy with reference to FIG. 3. FIG. 3 shows an example of the region table 321 in the preferred embodiment. The region table 321 records a region data as a parameter to set the retrieval region in relation to the movement speed of the terminal 1. The region data includes distances in four directions such as the movement direction, the backward direction, the right direction and the left direction, with respect to the current position data of the terminal 1.

In FIG. 3, the state of the terminal 1 is represented on the basis of the movement speed of the terminal 1, and a region data is defined on the basis of the distance (m) from a current position. For example, the state is set to "+100 m" in all the four directions for the movement speed "equal to or more than 0 km/h and less than 4 km/h", and this corresponds to "the stop state" in FIG. 2. Also, for the movement speed "equal to or more than 4 km/h and less than 10 km/h", the state is set to "+300 m" widely in the movement direction and "+20 m" narrowly in the backward direction. This corresponds to the brisk walking state in FIG. 2. Also, in "the running state" in FIG. 2, the retrieval region does not include the terminal 1. However, this state is set to "−50 m" in the backward direction, as indicated in the movement speed "10 km/h or more" in FIG. 3. It should be noted that the data of the region table 321 shown in FIG. 3 is only an example, and the present invention is not limited to the example.

Next, the information database 34 records various data browsed by the user.

FIG. 4 is a diagram showing one example of the information database 34 in the preferred embodiment. The information database 34 includes an ID, a section, a subsection, a name, a link destination and a position data. The ID field stores a identification data uniquely assigned to the data recorded in the information database 34. The section and the subsection fields store data serving as retrieval keys when the recorded data is retrieved. The name field stores a name of the data. The link destination field stores URL (Uniform Resource Locator) of a Web server that stores the data. A position data field stores a position corresponding to the data. For example, when the server 3 receives a data request of "PASTRY SHOP" from the terminal 1, the data of "PASTRY SHOP" included in the above retrieval region are specified in accordance with the position data in the position data field, and the corresponding name and link destination are extracted from the name field and the link destination field. It should be noted that since the information database 34 shown in FIG. 4 is only exemplified. Also, since the preferred embodiment uses only the latitude and the longitude as the position data, the position data field stores the coordinates (x, y). However, when a height is also used to perform the information retrieval, the position data field stores the coordinates (x, y, z) including the height.

It should be noted that the data recorded in the information database 34 are not limited to the above data, and various data can be used. For example, homepages, blogs and twittering on a network such as the internet has the position data, a title of writings created on the basis of data such as image and sound, or data to which the position data is given, a thumbnail of an image, and a sound data can be applied.

Next, the control section 33 attains the functions of the server 3. The control section 33 is configured of a CPU. The control section 33 attains the functions of the server 3 by reading and executing the processing program recorded in the storage section 32. The control section 33 is provided with a state acquiring section 331, a region determining section 332 and an information extracting section 333. The state acquiring section 331, the region determining section 332 and the information extracting section 333 will be described below.

At first, the state acquiring section 331 calculates the state of the terminal 1. The state acquiring section 331 receives the position data of the terminal 1 from the terminal 1 and stores the state of the terminal 1 in accordance with the position data of the terminal 1. In the preferred embodiment, as mentioned above, the state includes the movement direction and movement speed of the terminal 1. The state acquiring section 331 stores the calculated movement direction and movement speed in relation to the identifier of the terminal 1.

Figure 5:
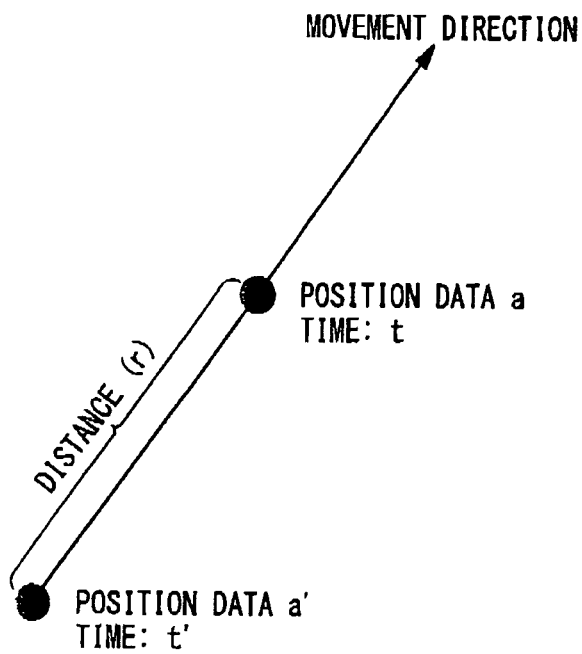
FIG. 5 is a diagram showing a relation between a position data of a terminal and a movement direction in the first preferred embodiment.

FIG. 5 is used to describe the policy for the state acquiring section 331 to calculate the state. FIG. 5 is a diagram showing a relation between the position data of the terminal 1 and the state calculated by the state acquiring section 331 in the preferred embodiment. The state acquiring section 331 calculates the state in accordance with the position data at two points that are received from the terminal 1. In FIG. 5, a position data a and a position data a' are the position data that are measured continuously in an order of the position data a' (a time t') and the position data a (a time t) in the terminal 1. The state acquiring section 331 determines a distance between the position data a' and the position data a in accordance with the coordinates of the position data a' and the position data a. Also, a time period between the measured times is determined in accordance with the time t' when the position data a' is measured and the time t when the position data a is measured. When the distance between the position data a' and the position data a is assumed to be r, the state acquiring section 331 calculates the movement speed=the distance (r)/(the time t−the time t'), as shown in FIG. 5. Also, the state acquiring section 331 determines the movement direction as an extension line which links the position data a' and the position data a in accordance with the coordinates of the position data a' and the position data a. In this way, the state acquiring section 331 calculates the movement direction and the movement speed.

Next, the region determining section 332 determines the retrieval region. The region determining section 332 specifies a specified retrieval region in which the retrieval data is extracted from the information database 34, from the region table 321 in accordance with the movement speed calculated by the state acquiring section 331. When this will be described with reference to FIG. 3, for example, it is supposed that the state acquiring section 331 calculates that the movement speed of the terminal 1 is "7 km/h", the region determining section 332 refers to the region table 321 and specifies the region data of "Travel Direction +300 m, Backward Direction +20 m, Right Lateral Direction +50 m, Left Lateral Direction +50 m" which corresponds to the movement speed "equal to or more than 4 km/h and less than 10 km/h" and determines that this range is the specified retrieval region.

Next, the information extracting section 333 extracts the retrieval data. The information extracting section 333 extracts the data having the position data within the specified retrieval region as the retrieval data from the registration data registered in the information database 34 in accordance with the specified retrieval region determined by the region determining section 332. The process of extracting the retrieval data by the information extracting section 333 will be described below.

Figure 6:
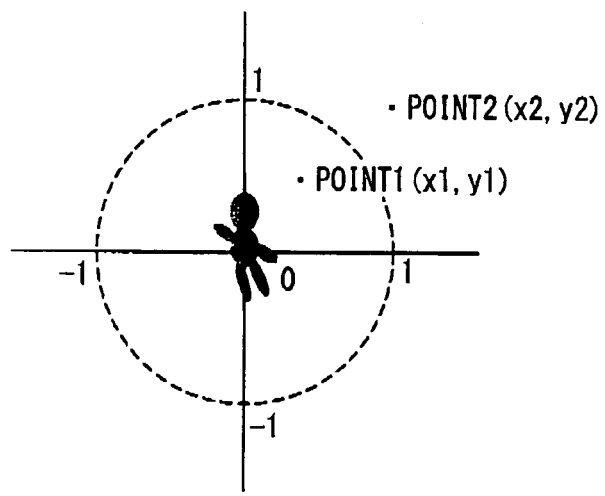
FIG. 6 is a diagram showing extraction of browser data, when a specified retrieval region is circular.

FIG. 6 is a diagram describing the process of extracting the retrieval data by the information extracting section 333, when the specified retrieval region in the preferred embodiment is circular. The information extracting section 333 defines the coordinates of the current position of the terminal 1 and determines based on whether or not the coordinates of the data of the information database 34 (hereinafter, to be referred to as a process target data) satisfy the following equation (1), whether or not the process target data is determined to be the retrieval data.

$$x^2 + y^2 \le 1 \tag{1}$$

where the coordinates (x, y) of the process target data correspond to the X, Y of the equation (1). For example, since a point 1 (x1, y1) of one process target data satisfies the equation (1), this is determined to be the retrieval data. On the other hand, since a point 2 (x2, y2) of a different process target data does not satisfy the equation (1), this is not determined to be the retrieval data. It should be noted that in the above description, the current coordinates of the terminal 1 are defined as the origin. Thus, the point 1 (x1, y1) and the point 2 (x2, y2) as the coordinates of the process target data are corrected because the differences from the current coordinates of the terminal 1 are determined. In short, in case of the point 1 (x1, y1), when the current coordinates of the terminal 1 are assumed to be (p, q), (X, Y)=(x−p, y1−q).

Figure 7:
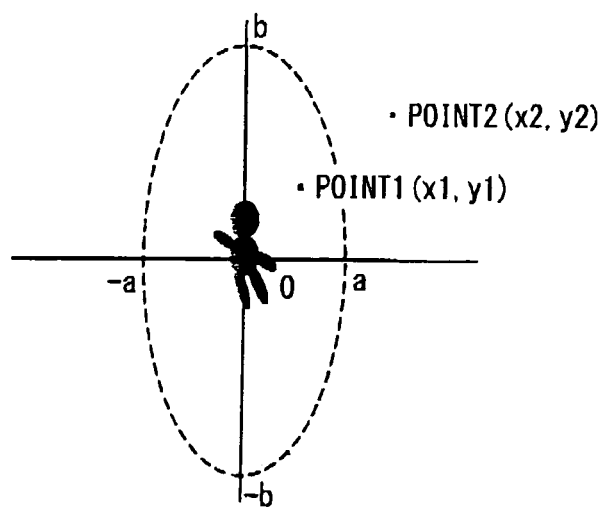
FIG. 7 is a diagram showing extraction of browser data, when a specified retrieval region is ellipsoidal.

Next, FIG. 7 is a diagram describing a process of extracting the retrieval data by the information extracting section 333, when the specified retrieval region in the preferred embodiment is ellipsoidal. The information extracting section 333 defines the coordinates of the current position of the terminal 1 as an origin and determines whether or not the process target data is determined to be the retrieval data in accordance with whether or not the coordinates of the process target data satisfy the following equation (2).

$$\left(\frac{X}{a}\right)^2 + \left(\frac{Y}{b}\right)^2 \le 1 \tag{2}$$

Here, "movement direction, backward direction, right direction, left direction" shown in FIG. 3 correspond to [b, −b, a, −a] in the ellipse in FIG. 7 and the equation (2), respectively. The coordinates (x, y) of the process target data correspond to the X, Y in the equation (2). For example, since the point 1 (x1, y1) of one process target data satisfies the equation (2), this data is determined to be the retrieval data. On the other hand, since the point 2 (x2, y2) of the other process target data does not satisfy the equation (2), this data is not determined to be the retrieval data. It should be noted that in the above description, the current coordinates of the terminal 1 are defined as the origin. Thus, the point 1 (x1, y1) and the point 2 (x2, y2) as the coordinates of the process target data are corrected because the differences from the current coordinates of the terminal 1 are determined. In short, in the case of the point 1 (x1, y1), when the current coordinates of the terminal 1 are assumed to be (p, q), (X, Y)=(x1−p, y1−q).

Figure 8:
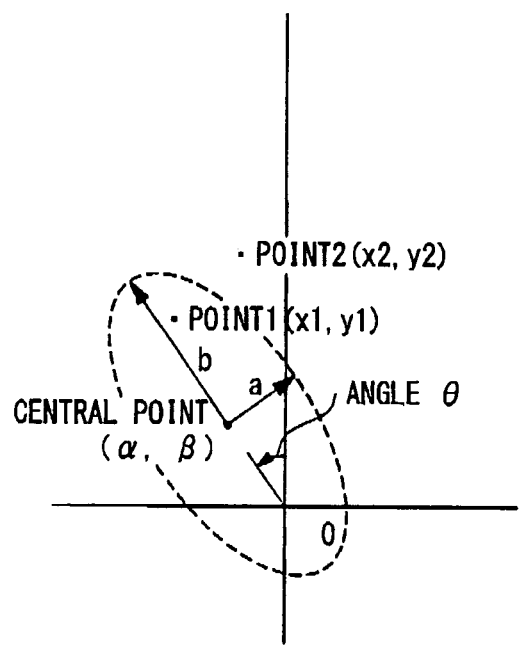
FIG. 8 is a diagram showing extraction of browser data, when a specified retrieval region is ellipsoidal.

Next, FIG. 8 is a diagram describing the process of extracting the retrieval data by the information extracting section 333, by considering the directional components of the movement direction, when the specified retrieval region in the preferred embodiment is ellipsoidal. The information extracting section 333 defines the coordinates of the current position of the terminal 1 as the origin and determines whether or not the process target data is determined to be the retrieval data in accordance with whether or not the coordinates of the process target data satisfy the following equation (3).

$$\left(\frac{X' - \alpha'}{a}\right)^2 + \left(\frac{Y' - \beta'}{b}\right)^2 \le 1 \tag{3}$$

Here, "movement direction, backward direction, right direction, left direction" shown in FIG. 3 correspond to [b, −b, a, −a] in the ellipse in FIG. 7 and the equation (3), respectively. Also, a central point (α, β) indicates the central point of the ellipse, and this is corrected to (α', β') by the following equation (4) and substituted into the equation (3). The current coordinates of the terminal 1 serve as the origin. The coordinates (x, y) of the process target data corrected by considering the directional components in the movement direction correspond to X', Y' of the equation (3). After the coordinates (x, y) of the process target data are substituted into the X, Y prior to the compensation, the X', Y' after the compensation is calculated by the following equation (5) and then substituted into the equation (3).

$$\begin{pmatrix} \alpha' \\ \beta' \end{pmatrix} = \begin{pmatrix} \cos\theta & \sin\theta \\ -\sin\theta & \cos\theta \end{pmatrix} \begin{pmatrix} \alpha \\ \beta \end{pmatrix} \quad (4)$$

$$\begin{pmatrix} X' \\ Y' \end{pmatrix} = \begin{pmatrix} \cos\theta & \sin\theta \\ -\sin\theta & \cos\theta \end{pmatrix} \begin{pmatrix} X \\ Y \end{pmatrix} \quad (5)$$

For example, since the point 1 (x1, y1) of one process target data satisfies the equation (3), this data is determined to be the retrieval data. On the other hand, since the point 2 (x2, y2) of the other process target data does not satisfy the equation (3), this data is not determined to be the retrieval data. In this way, the information extracting section 333 extracts the retrieval data within the specified retrieval region. It should be noted that in the above description, the current coordinates of the terminal 1 are defined as the origin. Thus, the point 1 (x1, y1) and the point 2 (x2, y2) as the coordinates of the process target data are corrected because the differences from the current coordinates of the terminal 1 are determined. In short, in a case of the point 1 (z1, y1), when the current coordinates of the terminal 1 are assumed to be (p, q), (X, Y)=(x1−p, y1−q).

The above is the description of the configuration of the information providing system in the preferred embodiment. In this way, in the information providing system in the preferred embodiment, the retrieval region determined based on the movement speed of the terminal 1 is used to extract the data to be browsed by the user. Thus, the information providing system in the preferred embodiment can output the data in the proper range to the terminal 1 based on the state of the terminal 1.

It should be noted that in the preferred embodiment, the movement speed of the terminal 1 is calculated on the basis the position data of the two points acquired by the position data acquiring section. However, the present invention is not limited to this method. For example, the terminal 1 may further contain an acceleration sensor and detect the movement speed from the acceleration sensor. Or, when the terminal 1 is used in a car or bicycle, its speed may be acquired from a built-in speed meter or, the user may input the current state and use this as the movement speed. This is similar for the movement direction of the terminal 1. The movement direction of the terminal 1 is calculated on the basis the position data of the two points acquired by the position data acquiring section. However, the present invention is not limited to this method. For example, the terminal 1 may contain the acceleration sensor and a gyro sensor and use the acceleration sensor and the gyro sensor to detect the movement direction of the terminal 1.

Also, in the preferred embodiment, the position data will be described with regard to only the latitude and longitude (x, y). However, as mentioned above, the height (z) may be also added as a part of the data. In this case, when the retrieval region is specified as a circle, the ellipse or the fan shape as mentioned above, the range may be specified as a three-dimensional shape that includes the height. Even for the registration data registered in the information database 34, it is possible to carry out the data provision in which the height is considered, by giving the three-dimensional (x, y, z) position data. Thus, for example, when the user is located on a certain floor in a building such as a department store, it is possible to provide the information inside the same floor and the like.

Also, in the preferred embodiment, the information database 34 may be included a unit different from the server 3. For example, it may be configured as the information server that is provided with the information database 34. In this case, the information server may be connected to the network 2 and accessed through the network 2 from the server 3.

Also, in the preferred embodiment, the region table 321, the state acquiring section 331, the region determining section 332 and the information extracting section 333 in the server 3 may be contained in the terminal 1. Or, those configurations may be configured as the separate units to provide the respective functions, and each of them may be configured to able to be accessed through the network 2. In short, the configuration determined based on FIG. 1 is only exemplified as the configuration in the preferred embodiment. The unit in which the above configuration is contained can be flexibly changed.

Figure 9:
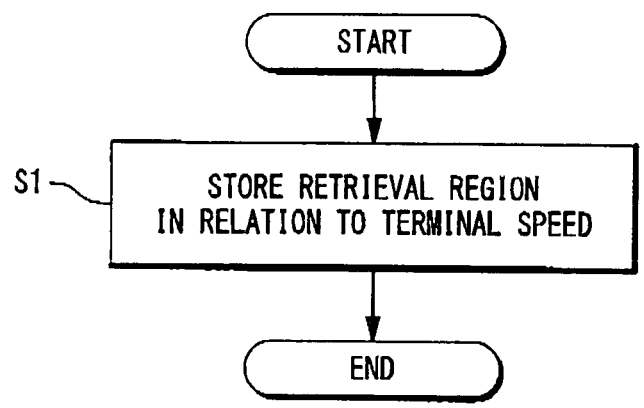
FIG. 9 is a control flow of storing the retrieval region in the region table 321 in the first preferred embodiment.

The operating method of the information providing system in the preferred embodiment will be described below. At first, the operation method of registering the retrieval region in the region table 321 in the preferred embodiment will be described. FIG. 9 is a control flow in which the retrieval region is registered in the region table 321 in the preferred embodiment.
(Step S1)
A supervisor of the information providing system registers the retrieval region in the region table 321 of the storage section 32 in the server 3, through an input section (not shown) of the server 3 or through the network 2. As mentioned above, the retrieval region in the preferred embodiment is stored in accordance with the movement speed of the terminal 1. It should be noted that the movement speed of the terminal 1 may be represented as sections such as "walking" and "running" as shown in FIG. 2 or may be represented as the sections based on the speed described in the region table 321 in FIG. 3. The retrieval region may be changed not only by the manager of the information providing system but also by the user. In this way, since the retrieval region based on the movement speed of the terminal 1 is preset, it is possible to extract the data based on the state of the user.

Figure 10:
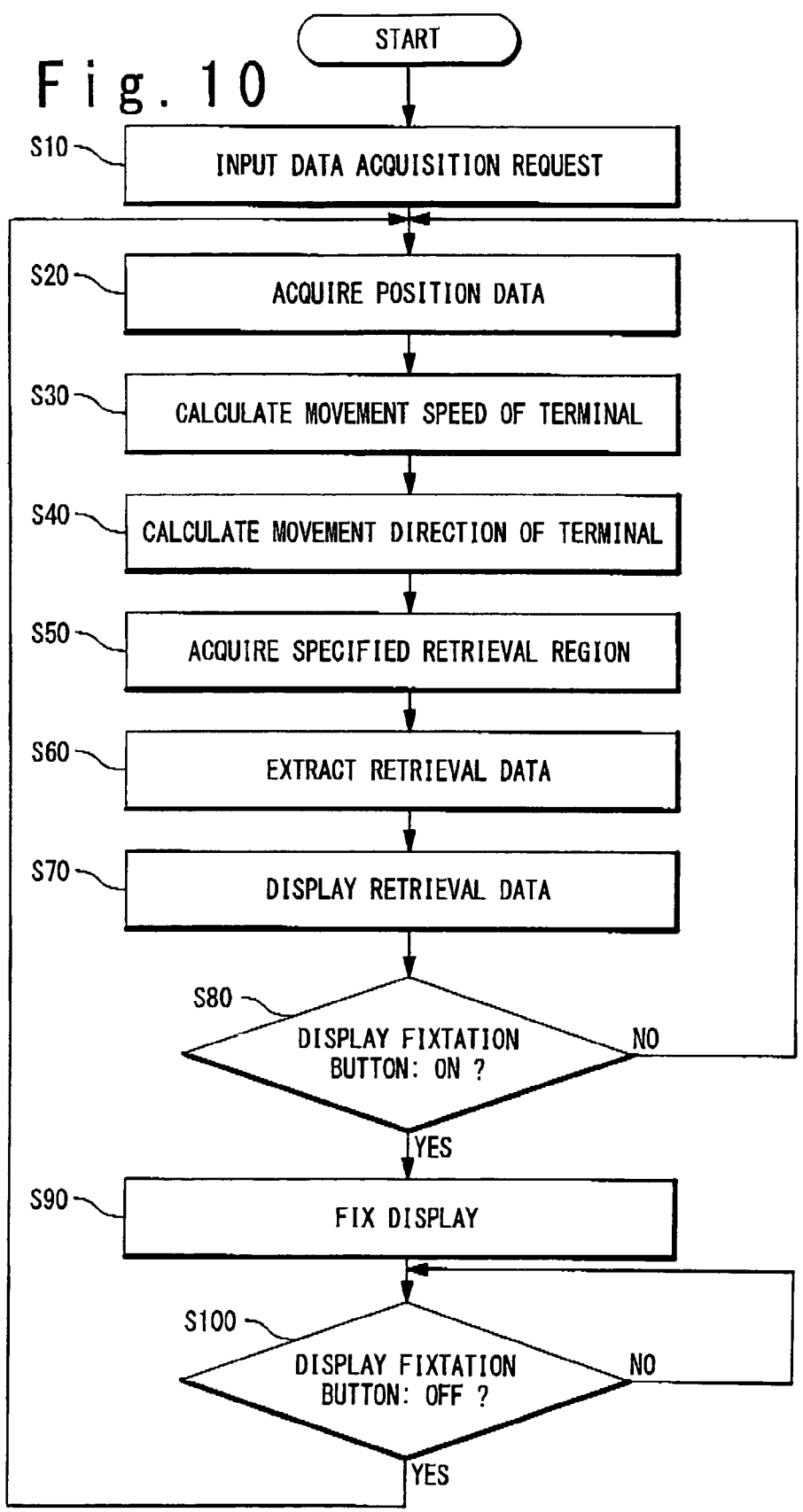
FIG. 10 is a control flow of providing browser data to the terminal in the first preferred embodiment.

The operating method in which the information providing system in the preferred embodiment is used to provide the retrieval data to the terminal 1 will be described below. FIG. 10 is a control flow in which the information providing system in the preferred embodiment is used to provide the retrieval data to the terminal 1.
(Step S10)
The user inputs a data acquisition request to the input section 12 in the terminal 1. The data acquisition request includes a retrieval key such as a "restaurant". When detecting the data acquisition request from the user, the information acquiring section 151 in the terminal 1 transmits a data request including the input retrieval key to the server 3 through the communicating section 13. The communicating section 31 in the server 3 receives the data request from the terminal 1 through the network 2. The state acquiring section 331 in the control section 33 receives the data request from the terminal 1 and starts a state calculating operation of the terminal 1.
(Step S20)
The position data acquiring section 11 acquires the position data. When transmitting the data request, the control section 15 instructs the position data acquiring section 11 to acquire the position data. When receiving a position data request command, the position data acquiring section 11 starts periodically acquiring the position data to output to the control section 15. When periodically receiving the position data from the position data acquiring section 11, the information acquiring section 151 transmits a position data notice message including the position data, the acquisition time of the position data and the identifier of the terminal 1 through the communicating section 13 to the server 3. It should be noted that the position data acquiring section 11 may acquire the position data in advance and periodically without starting the acquisition of the position data after receiving the command from the control section 15.

(Step S30)

The state acquiring section 331 in the server 3 calculates the movement speed. The state acquiring section 331 receives the position data notice message from the terminal 1 through the communicating section 31. The state acquiring section 331 stores the position data and the acquisition time of the position data of the position data notice message in relation to the identifier of the terminal 1. The state acquiring section 331 calculates the movement speed of the terminal 1 in accordance with the position data of the continuous two points and the acquisition time of the position data acquired from the terminal 1, as described in FIG. 5. The state acquiring section 331 calculates the movement speed of the terminal 1 for each time of acquisition of the position data from the terminal 1.

(Step S40)

The state acquiring section 331 in the server 3 calculates the movement direction of the terminal 1. The state acquiring section 331 calculates the movement direction of the terminal 1 simultaneously with the calculation of the movement speed. The state acquiring section 331 calculates the movement direction of the terminal 1 in accordance with the position data of the two points used to calculate the movement speed, as described in FIG. 5. The state acquiring section 331 calculates the movement direction of the terminal 1 for each time of acquisition of the position data from the terminal 1.

(Step S50)

The region determining section 332 in the server 3 acquires the specified retrieval region. The region table 321 in the storage section 32 stores the retrieval region in relation to the movement speed of the terminal 1, as described in FIG. 3. The region determining section 332 acquires as the specified retrieval region, the retrieval region corresponding to the movement speed from the region table 321 in accordance with the movement speed of the terminal 1 calculated by the state acquiring section 331. The region determining section 332 acquires the specified retrieval region from the region table 321, each time the state acquiring section 331 calculates the movement speed of the terminal 1.

(Step S60)

The information extracting section 333 in the server 3 extracts the retrieval data. The information extracting section 333 extracts the retrieval data from the information database 34. The information database 34 relates the registration data and the position data of the registration data and records them, as described in FIG. 4. As described in FIGS. 6 to 8, the information extracting section 333 uses the position data and the movement direction of the terminal 1, to extract the retrieval data that is included in the specified retrieval region determined by the region determining section 332 from the registration data recorded in the information database 34.

(Step S70)

The display section 16 in the terminal 1 displays the retrieval data. The information extracting section 333 in the server 3 transmits the extracted retrieval data through the communicating section 31 to the terminal 1. The information acquiring section 151 in the terminal 1 receives the retrieval data through the communicating section 13. The display control section 152 in the control section 31 displays the retrieval data on the display section 16. The retrieval data may be displayed as a list of the data, or only the number of retrieval data may be merely displayed. Also, the position of the retrieval data may be indicated in a map. In this case, the range that belongs to the specified retrieval region may be further indicated. Such a map may be stored in the storage section 32 or the information database 34 in the server 3, or the storage section 14 in the terminal 1. Also, while the terminal 1 is moving, only the title and name of the retrieval data are designed to be displayed, and when the terminal 1 is in the stop state, the schema of the retrieval data may be additionally displayed. Thus, it is possible to reduce a data transmission/reception amount during the movement and to increase the visibility of the display section 16. Moreover, when the retrieval data includes a sound data, the sound is outputted to a sound output unit such as a speaker and an earphone (both not shown) in the terminal 1. At this time, when the retrieval data includes a plurality of sound data, the height of the tone and a kind of the tone in each sound may be changed to output the plurality of sounds which can be heard by the user at the same time.

(Step S80)

The display control section 152 in the terminal 1 determines whether or not the display fixtation button of the input section 12 has been turned ON. If the display fixtation button 121 is turned ON, the control flow proceeds to a step S90. On the other hand, if the display fixtation button 121 is not turned ON, the control flow returns to the step S20. In this case, the steps S20 to S70 are repeated, and each time the terminal 1 acquires the position data, the retrieval data displayed on the display section 16 in the terminal 1 is updated on the basis of the change in the state of the terminal 1 (the changes in the movement speed and the moving method). It should be noted that when in its middle, the user releases the data request, the terminal 1 stops acquiring the position data. Then, this operation method is ended.

(Step S90)

The display control section 152 in the server 3 fixes the displaying on the display section 16. When detecting that the user turns ON the display fixtation button 121, the display control section 152 in the control section 15 fixes the data currently displayed on the display section 16. In this case, the information acquiring section 151 discards the retrieval data received from the server 3 in a period during which the display fixtation button 121 is turned ON. Thus, the specified, retrieval region displayed on the display section 16 is fixed, thereby permitting the user to easily select the retrieval data. It should be noted that the information acquiring section 151 may transmit a transmission stop request of the retrieval data to the server 3 and temporarily stop the retrieval data from the server 3, without discarding the retrieval data received from the server 3, which the display fixtation button 121 is turned ON. Thus, it is possible to suppress a usable communication band. In this case, when the display fixtation button is turned OFF (which will be described later), the information acquiring section 151 transmits a transmission restart request of the retrieval data to the server 3, and the server 3 restarts the transmission of the retrieval data. Or, in the period during which the display fixtation button 121 is turned ON, the information acquiring section 151 may update the retrieval data received from the server 3 and stores in the storage section 14.

(Step S100)

The display control section 152 in the terminal 1 determines whether or not the user turns OFF the display fixtation button in the input section 12. If the display fixtation button 121 is not turned OFF, the step S100 is repeated until the display fixtation button 121 is turned OFF. On the other hand, if the display fixtation button 121 is turned OFF, the control flow returns to the step S20. In this case, the steps S20 to S70 are again executed, and each time the terminal 1 acquires the position data, the retrieval data displayed on the display section 16 in the terminal 1 is updated on the basis of the change in the state of the terminal 1 (the changes in the movement speed and the moving method). It should be noted that when the user releases the data acquisition request, the terminal 1 stops the acquisition of the position data, and the operation method is ended.

Hereinbefore, the information providing system in the preferred embodiment has been described. According to the information providing system in the preferred embodiment, the extraction range of the data that is changed on the basis of the movement speed of the terminal 1 is recorded in the server 3 in advance, and the retrieval data is extracted from the information database 34, in accordance with the determined specification extraction range, on the basis of the movement speed of the user. Thus, the user can browse the data in the proper range based on the state, on the terminal. Also, only the information within the specified extraction range is extracted from the information database 34. Thus, it is possible to reduce the processing load on the information extracting section 333, and it is also possible to suppress a data amount transmitted to the terminal 1. Also, the calculation amount of the information extracting section 333 is reduced, which makes the responsibility to the terminal 1 better.

Second Preferred Embodiment

The information providing system according to the second preferred embodiment of the present invention will be described below.

The information providing system in the present preferred embodiment determines the specified retrieval region by considering the orientation of the terminal 1 in addition to the movement speed of the terminal 1, similarly to the first preferred embodiment. When the movement direction of the terminal 1 and the orientation of the terminal 1 differ from each other, compensation is carried out for enlarging the specified retrieval region in the orientation direction of the terminal 1. Such a state is considered, for example, in a case that the user of the terminal 1 gets in an electric train. When the user stands toward a window with respect to the movement direction of the electric train that is the movement direction of the terminal 1, the movement direction of the terminal 1 and the orientation of the terminal 1 differ from each other. According to the present preferred embodiment, in such a case, it is possible to provide a larger quantity of data in the orientation of the terminal 1 that is the direction in which the user is oriented.

Figure 11:
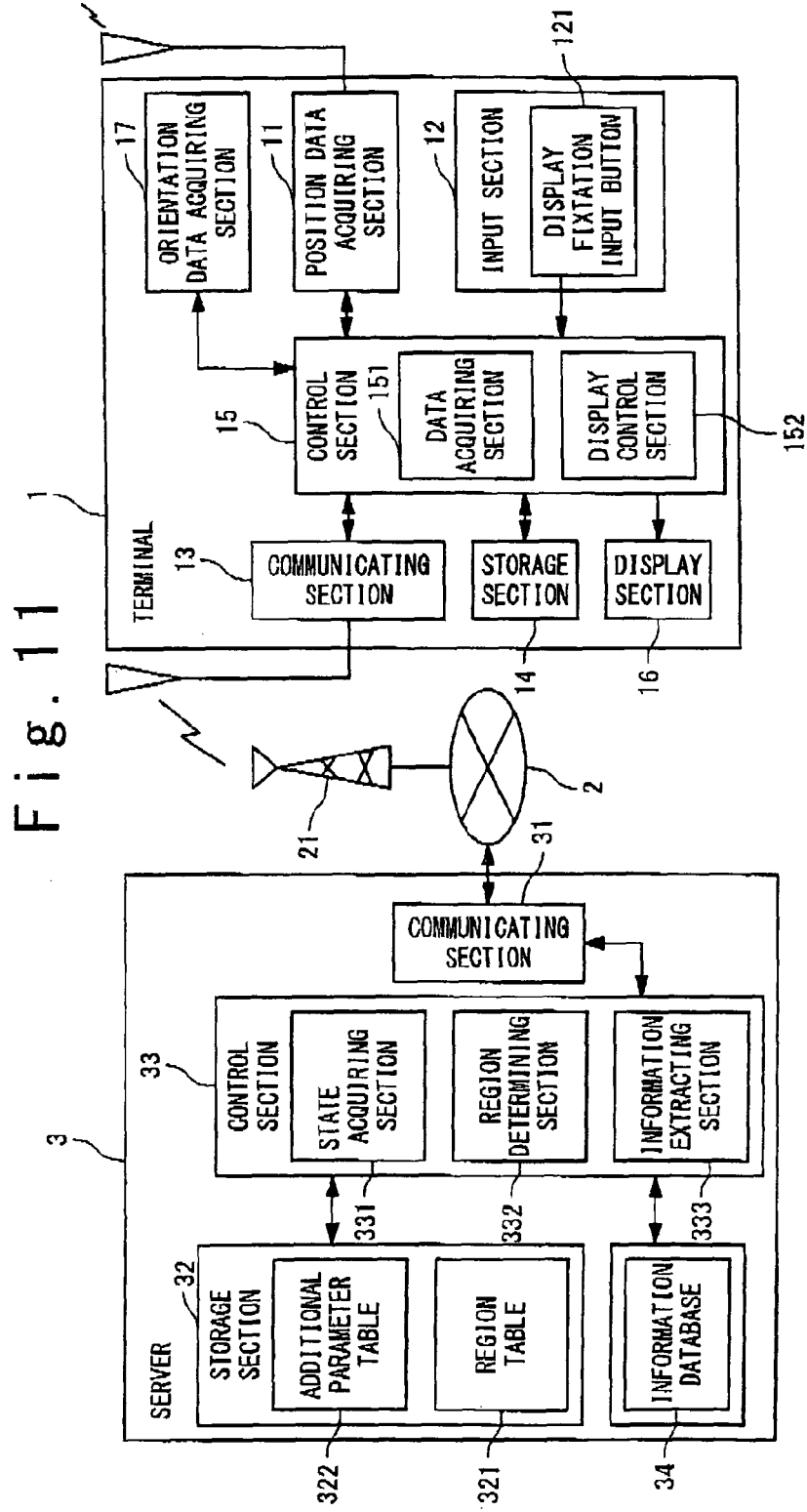
FIG. 11 is a diagram showing a configuration of the information providing system according to a second preferred embodiment of the present invention.

At first, the configuration of the information providing system in the present preferred embodiment will be described. FIG. 11 is a diagram showing the configuration of the information providing system in the present preferred embodiment. The configuration of the information providing system in the present preferred embodiment is substantially similar to that of the first preferred embodiment. Thus, a portion different from the first preferred embodiment will be described, and the description of the portions similar to the first preferred embodiment is omitted. Also, the same components as those of the first preferred embodiment are assigned with the same reference numerals or symbols and the description of them are omitted.

The information providing system in the present preferred embodiment is provided with the terminal 1, the network 2 and the server 3, similarly to the first preferred embodiment. It should be noted that since the network 2 is similar to that of the first preferred embodiment, its description is omitted.

At first, the terminal 1 will be described. The terminal 1 is provided with the position data acquiring section 11, the input section 12, the communicating section 13, the storage section 14, the control section 15 and the display section 16, similarly to the first preferred embodiment, and further is provided with an orientation data acquiring section 17 in the present preferred embodiment. It should be noted that the position data acquiring section 11, the input section 12, the communicating section, the storage section 14 and the display section 16 are similar to those of the first preferred embodiment. Thus, their descriptions are omitted.

The orientation data acquiring section 17 acquires an orientation data of the terminal 1. The orientation data acquiring section 17 is an electronic compass. The orientation data detected by the orientation data acquiring section 17 serves to indicate the orientation of the terminal 1. The orientation data acquiring section 17 acquires the orientation data at the same time as the position data acquiring section 11 acquires the position data. The orientation data acquiring section 17 is connected to the control section 15 and outputs the acquired orientation data to the control section 15. It should be noted that the orientation data acquiring section 17 is not limited to the electronic compass. Then, it may be a gyro sensor, or it may be configured such that the orientation is inputted by the user. If the orientation of the terminal 1 can be acquired, the different technique can be used instead of the orientation data acquiring section 17.

Next, the control section 15 is provided with the information acquiring section 151 and the display control section 152 similarly to the first preferred embodiment. It should be noted that since the display control section 152 is similar to that of the first preferred embodiment, its description is omitted. The information acquiring section 151 in the present preferred embodiment transmits to the server 3, the position data notice message which includes the orientation of the terminal 1 acquired by the orientation data acquiring section 17, in addition to the position data of the terminal 1, the acquisition time of the position data, and the terminal identifier.

The server 3 will be described below. The server 3 is provided with the communicating section 31, the storage section 32, the control section 33 and the information database 34, similarly to the first preferred embodiment. It should be noted that since the communicating section 31 is similar to that of the first preferred embodiment, its description is omitted. The respective configurations will be described below.

The storage section 32 is provided with the region table 321 similarly to the first preferred embodiment and further is provided with an additional parameter table 322 in the present preferred embodiment. It should be noted that since the region table 321 is similar to that of the first preferred embodiment, its description is omitted.

Here, a policy for setting the retrieval region in the present preferred embodiment will be described with reference to FIG. 12. FIG. 12 is a diagram showing the policy for setting the retrieval region in the present preferred embodiment. The retrieval region in the present preferred embodiment is changed on the basis of the state of the terminal 1, similarly to the first preferred embodiment. In the present preferred embodiment, the state of the terminal 1 further includes the orientation of the terminal 1, in addition to the movement direction and movement speed of the terminal 1, similarly to the first preferred embodiment. In short, the retrieval region in the present preferred embodiment is changed on the basis of the movement direction and movement speed of the terminal 1, similarly to the first preferred embodiment, and it is further changed on the basis of the movement direction of the terminal 1 and the orientation of the terminal 1.

FIG. 12 shows the specifying methods of two kinds, namely, a case (1) that the ellipse is used to specify the retrieval region and a case (2) that the fan shape is used to specify the retrieval region, in relation to the states of the terminal 1 (in short, the state of the user having the terminal 1, the car containing the terminal 1, and the like). It should be noted that FIG. 12 shows only the case that the movement direction of the terminal 1 and the orientation of the terminal 1 are different. The case that the movement direction of the terminal 1 and the orientation of the terminal 1 coincide with each other is similar to the first preferred embodiment. Thus, its description is omitted. FIG. 12 shows the four states of the stop state, the walking state, the brisk walking state, and the running state, based on the movement speeds of the terminal 1.

The case that the ellipse is used to specify the retrieval region will be described as an example. At first, when the terminal 1 is in the stop state, the range of the circle whose radius is constant (for example, r) with the terminal 1 located at the center is assumed to be the retrieval region, similarly to the first preferred embodiment. This is because the state in which the terminal 1 is in the stop state is considered such that the orientation of the terminal 1 does not have influence on the data acquisition.

When the terminal 1 is moving in the speed of each of the walking state, the brisk walking state and the running state, and when the movement direction of the terminal 1 and the orientation of the terminal 1 do not coincide, the retrieval region is enlarged in the orientation direction of the terminal. For example, the short diameter of the ellipse of the retrieval region is enlarged by "+50 m" in the orientation direction of the terminal 1. In association with this enlargement, the retrieval region is enlarged in the orientation direction of the terminal 1. Thus, as compared with the retrieval region corresponding to the speed of each of the walking, the brisk walking and the running shown in FIG. 2, each of the retrieval regions shown in FIG. 12 is made wider in the orientation direction of the terminal.

Consequently, as mentioned above, when the user gets in the vehicle and when the movement direction of the terminal 1 and the orientation of the terminal 1 do not coincide, the retrieval region is set wide in the orientation direction of the terminal 1. Thus, it is possible to extract a large quantity of data in the direction in which the user seems to be oriented. It should be noted that as for the coincidence degree between the movement direction of the terminal 1 and the orientation of the terminal 1, the selection of whether or not they coincide is sufficient, or the anticoincidence degree between the movement direction of the terminal 1 and the orientation of the terminal 1 is determined from the angle, and the degree at which the retrieval region is enlarged may be changed on the basis of the anticoincidence degree. In the following description, the case that the retrieval region is corrected on the basis of only the selection of whether or not they coincide will be described.

Also, this is similar even in the case that the fan shape is used to specify the retrieval region, as shown in FIG. 12. When the fan shape is used to specify the retrieval region, similarly to the first preferred embodiment, the radius of the circle for the fan shape is set long on the basis of the movement speed. In addition to this, when the movement direction of the terminal 1 and the orientation of the terminal 1 do not coincide, the fan shape is reclined in the orientation direction of the terminal 1 so that the area in the orientation direction of the terminal 1 is made wide. For example, when the terminal 1 is moving at the walking speed, the first preferred embodiment is designed to exhibit the fan shape in which the shape is uniform from the movement direction of the terminal 1 to both sides and the central angle is 135°. However, when the movement direction of the terminal 1 and the orientation of the terminal 1 do not coincide, this is designed to exhibit the angle of 90° in the orientation direction of the terminal and the angle of 45° in the direction opposite to the orientation of the terminal. It should be noted that the reclining degree of the fan shape is not especially limited, and this may be determined by the manager of the information providing system or the user of the terminal 1. Since the other speed divisions are similar, their descriptions are omitted.

The data recorded in the additional parameter table 322 will be described below in accordance with the above policy with reference to FIG. 13. FIG. 13 shows one example of the additional parameter table 322 in the present preferred embodiment. The additional parameter table 322 records the parameter to correct the retrieval region in relation to the movement speed of the terminal 1. With reference to FIG. 13, in the additional parameter table 322 in the present preferred embodiment, the compensation is carried out such that the retrieval region is enlarged by "+20 m" in the terminal orientation direction, in all of the divisions of the movement speed, and it is recorded. It should be noted that this is consistently exemplified. For example, the compensation value may be changed for each speed division.

Next, the control section 33 is provided with the state acquiring section 331, the region determining section 332 and the information extracting section 333, similarly to the first preferred embodiment.

At first, the state acquiring section 331 calculates the state of the terminal 1. In the present preferred embodiment, the state includes the orientation of the terminal 1, in addition to the movement direction and movement speed of the terminal 1. The state acquiring section 331 stores the movement direction and the movement speed of the terminal 1 and the orientation of the terminal 1, which are already calculated in relation to the identifier of the terminal 1.

Next, the region determining section 332 determines the retrieval region. The region determining section 332 specifies the specified retrieval region in which the retrieval data is extracted from the information database 34, from the region table 321 in accordance with the movement speed calculated by the state acquiring section 331. Moreover, in the present preferred embodiment, the region determining section 332 corrects the specified retrieval region in accordance with the movement direction of the terminal 1 and the orientation of the terminal 1, which are calculated by the state acquiring section 331. The region determining section 332 determines whether or not the movement direction of the terminal 1 and the orientation of the terminal 1 coincide with each other. If the movement direction of the terminal 1 and the orientation of the terminal 1 are different, the region determining section 332 corrects the specified retrieval region, and if the movement direction of the terminal 1 and the orientation of the terminal 1 coincide with each other, the region determining section 332 does not correct the specified retrieval region. If the movement direction of the terminal 1 and the orientation of the terminal 1 do not coincide, the region determining section 332 acquires an additional parameter from the additional parameter table 322 in the storage section 32 and corrects the specified retrieval region.

This will be described with reference to FIG. 3. For example, it is supposed that the state acquiring section 331 calculates the movement speed of the terminal 1 as "7 km/h". Then, the region determining section 332 refers to the region table 321 and specifies as the specified retrieval region, the in-region data "movement direction +300 m, backward direction +20 m, right direction +50 m, and left direction +50 m" corresponding to the speed division "equal to or more than 4 km/h and less than 10 km/h". Moreover, the region determining section 332 determines whether or not the movement direction of the terminal 1 and the orientation of the terminal 1 coincide with each other. If they do not coincide, the region determining section 332 acquires the additional parameter from the additional parameter table 322 shown in FIG. 13. In the present preferred embodiment, as shown in FIG. 13, "+20 m in orientation direction of terminal" is uniformly defined as the additional parameter. In the region determining section 332, the specified retrieval region is corrected on the basis of the additional parameter. As a result, if the orientation of the terminal is oriented in the right lateral direction with respect to the movement direction, the specified retrieval region is corrected to "movement direction +300 m, backward direction +20 m, right direction +70 m, left direction +50 m". The region determining section 332 determines that the specified retrieval region after the compensation is the specified retrieval region to be used.

Next, the information extracting section 333 extracts the retrieval data. The information extracting section 333 extracts as the retrieval data, the data that has the position data within the specified retrieval region from the registration data registered in the information database 34 in accordance with the specified retrieval region determined by the region determining section 332. The process of extracting the retrieval data by the information extracting section 333 in the present preferred embodiment will be described below.

Figure 14:
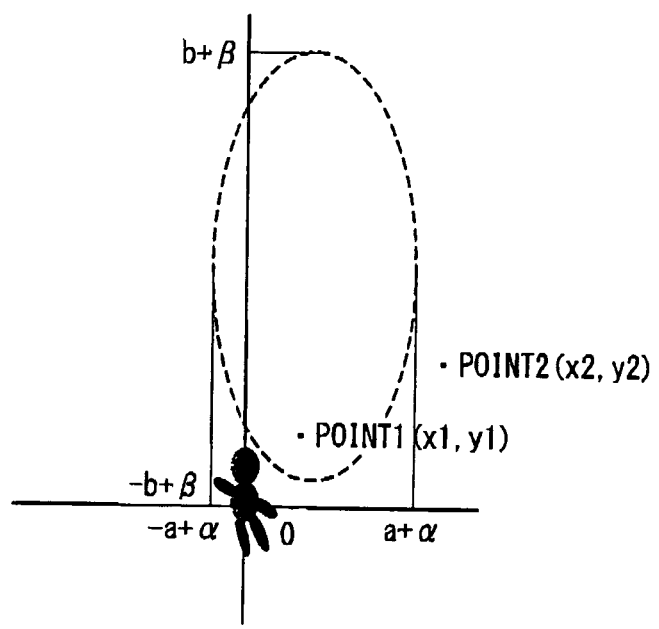
FIG. 14 is a diagram showing extraction of the browser data, when the specified retrieval region is ellipsoidal in the second preferred embodiment.

FIG. 14 is a diagram describing the process of extracting the retrieval data by the information extracting section 333, when the specified retrieval region is ellipsoidal in the present preferred embodiment. Also, in FIG. 14, for the compensation based on the additional parameter, the specified retrieval region is deviated with respect to the movement direction. The information extracting section 333 defines the coordinates of the current position of the terminal 1 as the origin and determines whether or not the process target data is determined to be the retrieval data in accordance with whether or not the coordinates of the process target data satisfy the following equation (6).

$$\left(\frac{X-\alpha}{a}\right)^2 + \left(\frac{Y-\beta}{b}\right)^2 \leq 1 \quad (6)$$

Here, "movement direction, backward direction, right direction, left direction" shown in FIG. 3 correspond to [b, −b, a, −a] in the ellipse in FIG. 14 and the equation (6), respectively. Also, (α, β) is the central point of the ellipse corrected on the basis of the additional parameter. The coordinates (x, y) of the process target data correspond to the X, Y of the equation (1). For example, since the point 1 (z1, y1) of one process target data satisfies the equation (6), this data is determined to be the retrieval data. On the other hand, since the point 2 (x2, y2) of a different process target data does not satisfy the equation (6), this data is not determined to be the retrieval data. It should be noted that in the above description, the current coordinates of the terminal 1 are defined as the origin. Thus, for the coordinates of the process target data, namely, the point 1 (z1, y1) and the point 2 (x2, y2) are corrected because the differences from the current coordinates of the terminal 1 are determined. In short, in the case of the point 1 (z1, y1), when the current coordinates of the terminal 1 are assumed to be (p, q), (X, Y)=(x1−p, y1−q).

In this way, the information providing system in the present preferred embodiment specifies the retrieval region based on the movement speed of the terminal 1. Moreover, when the movement direction of the terminal 1 and the orientation of the terminal 1 are different, the additional parameter based on the orientation of the terminal 1 is used to correct the retrieval region, and the retrieval region after the compensation is used to extract the data to be browsed by the user. In such a configuration, in a case that the user gets in the vehicle, even when the movement direction of the terminal 1 and the orientation of the terminal 1 are different, the data in the proper range based on the state of the terminal 1 can be outputted to the terminal 1.

The operating method of the information providing system in the present preferred embodiment will be described below. Hereinafter, the operating method will be described in which the information providing system in the present preferred embodiment is used to provide the retrieval data to the terminal 1. FIGS. 15A and 15B are the control flows in which the information providing system in the present preferred embodiment is used to provide the retrieval data to the terminal 1. It should be noted that it is supposed that the operation method of registering the retrieval region in the region table 321 as described in FIG. 9 is used to already register the retrieval region in the region table 321 and at the same time, the setting of the additional parameter for the additional parameter table 322 is completed. Also, the descriptions of the portions similar to those of the first preferred embodiment are properly omitted.

(Step S10)

The user inputs the data request to the input section 12 in the terminal 1. It should be noted that this step is similar to the step S10 described in FIG. 10.

(Step S20)

The position data acquiring section 11 acquires the position data and the orientation data. When transmitting the data request, the control section 15 instructs the position data acquiring section 11 to acquire the position data and instructs the orientation data acquiring section 17 to acquire the orientation data. When receiving the position data acquisition command, the position data acquiring section 11 starts periodic acquisition of the position data. Also, the orientation data acquiring section 17 acquires the orientation data that indicates the orientation of the terminal 1 at the same time as the position data acquiring section 11 acquires the position data. The position data acquiring section 11 outputs the acquired position data to the control section 15, and the orientation data acquiring section 17 outputs the acquired orientation data to the control section 15. When periodically acquiring the position data and the orientation data, the information acquiring section 151 transmits to the server 3 through the communicating section 13, the position data notice message, which stores the position data, the acquisition time of the position data, the orientation data, and the identifier of the terminal 1. It should be noted that the position data acquiring section 11 and the orientation data acquiring section 17 may acquire the position data and the orientation data in advance and periodically without starting the acquisition of the position data after receiving the command from the control section 15.

(Steps S30 to S50)

The steps S30 to S50 are similar to the steps S30 to S50 described in FIG. 10. That is, the state acquiring section 331 in the server 3 calculates the movement speed (Step S30). The state acquiring section 331 in the server 3 calculates the movement direction of the terminal 1 (Step S40). The region determining section 332 in then server 3 acquires the specified retrieval region (Step S50).

(Step S51)

The region determining section 332 in the server 3 determines whether or not the movement direction of the terminal 1 and the orientation of the terminal 1 coincide with each other. The region determining section 332 compares the movement direction of the terminal 1 calculated by the state acquiring section 331 and the orientation of the terminal 1 indicated by the orientation data of the terminal 1 coincide with each other. If the movement direction of the terminal 1 and the orientation of the terminal 1 coincide with each other, the control flow proceeds to a step S53. On the other hand, if the movement direction of the terminal 1 and the orientation of the terminal 1 do not coincide, the control flow proceeds to a step S52.

(Step S52)

The region determining section 332 acquires the additional parameter from the additional parameter table 322 in the storage section 32. If the movement direction of the terminal 1 and the orientation of the terminal 1 do not coincide, the region determining section 322 acquires the additional parameter shown in FIG. 13 as mentioned above, from the additional parameter table 322 in the storage section 32, in order to correct the specified retrieval region.

(Step S53)

The region determining section 332 in the server 3 determines the specified retrieval region. If the movement direction of the terminal 1 and the orientation of the terminal 1 coincide with each other, the region determining section 332 determines the specified retrieval region without compensating the specified retrieval region acquired from the region table 321. If the movement direction of the terminal 1 and the orientation of the terminal 1 do not coincide, the region determining section 332 corrects the specified retrieval region on the basis of the additional parameter and determines that the specified retrieval region after the compensation is the specified retrieval region.

(Steps S60 to S100)

The steps S60 to S100 are similar to the steps S60 to S100 described in FIG. 10. That is, the information extracting section 333 in the server 3 extracts the retrieval data (Step S60). The information extracting section 333 extracts the retrieval data included in the specified retrieval region acquired by the region determining section 332 from the registration data recorded in the information database 34, as described in FIG. 14. The display section 16 in the terminal 1 displays the retrieval data (Step S70). The display control section 152 in the terminal 1 determines whether or not the user turns ON the display fixtation button in the input section 12 (Step S80). The display control section 152 in the terminal 3 fixes the display of the display section 16 when the display fixtation button is turned ON (Step S90). The display control section 152 in the terminal 1 determines whether or not the user turns OFF the display fixtation button in the input section 12 (Step S100).

According to the information providing system in the present preferred embodiments, the extraction range of the data, which is changed on the basis of the movement speed of the terminal 1, and in addition to this, the additional parameter to correct the extraction range are recorded in the server 3 in advance. On the basis of the movement speed of the user, the retrieval data is extracted from the information database 34 in accordance with the determined specified retrieval region. Moreover, if the movement direction of the terminal 1 and the orientation of the terminal 1 do not coincide, the compensation for enlarging the retrieval region in the orientation direction of the terminal 1 is carried out on the basis of the additional parameter. Thus, the user can browse the data in the proper range based on the state of the terminal, even if the movement direction of the terminal 1 and the orientation of the terminal 1 are different, as in the case in which the user gets in the vehicle. Also, similarly to the first preferred embodiment, only the data within the specified retrieval region are extracted from the information database 34. Thus, it is possible to reduce the processing load on the information extracting section 333 and it is also possible to suppress the data amount transmitted to the terminal 1. Also, since the calculation amount of the information extracting section 333 is reduced, the responsibility to the terminal 1 is made better.

It should be noted that in the information providing system in the present invention, the region determining section 332 extracts the specified retrieval region on the basis of the movement speed of the terminal 1, from the region table 321 in which the movement speed of the terminal 1 and the retrieval region are related and recorded in advance. However, the region determining section 322 may use a preset calculation equation or coefficient and calculate the specified retrieval region in accordance with the movement speed of the terminal 1. In this case, the region determining section 332 can acquire the effect similar to that of the configuration of using the region table 321, by calculating the specified retrieval region in accordance with the calculation equation or coefficient based on the relation between the movement speed of the terminal 1 and the retrieval region, which are registered in the region table 321. This can be similarly said for the additional parameter. In short, the configuration in which the specified retrieval region can be changed on the basis of the movement speed of the terminal 1 is not limited to only the configuration in which the data is selected from the data recorded in the table in advance.

As mentioned above, the present invention will be described by referring to the present preferred embodiments. However, the present invention is not limited to the above-mentioned preferred embodiments. Various modifications could be performed by one skilled in the art without departing from the scope of the present invention.

What is claimed is:

1. An information providing system comprising a terminal and a server, wherein said terminal comprises:
 a position data acquiring section configured to acquire a position data of said terminal from a GPS (global positioning system) satellite; and
 a display section configured to display browser data, the display section comprising an LCD (liquid crystal display), and wherein said server comprises:
 an information database configured to record registration data in relation to said position data;
 a control section configured of a CPU (central processing unit), the control section comprising:
  a state data acquiring section configured to acquire state data indicating a state on a movement of said terminal;
  a region determining section configured to determine a specified retrieval region which is changed in response to said state data;
  an information extracting section configured to extract as said browser data from said information database, said registration data in which said position data corresponding to said registration data are included in said specified retrieval region, wherein said terminal further comprises an orientation data acquiring section configured to measure an orientation of said terminal, wherein said state data further comprises said terminal orientation, wherein said region determining section enlarges said specified retrieval region in said terminal orientation only when a terminal movement direction and said terminal orientation do not coincide, wherein the terminal orientation comprises information indicating an orientation of a body of the terminal itself, and wherein the terminal movement direction comprises a direction to which the terminal is moving.

2. The information providing system according to claim 1, wherein said state data includes a terminal movement speed and the terminal movement direction, and wherein said region determining section extends said specified retrieval region in the terminal movement direction in response to said terminal movement speed.

3. The information providing system according to claim 2, wherein said region determining section performs a correction of a data indicating what degree said specified retrieval region should be extended to into said terminal movement direction when said terminal movement direction and said terminal orientation do not coincide.

4. The information providing system according to claim 3, further comprising:

an addition parameter table in which a parameter is stored, wherein said region determining section perform a correction to extend said specified retrieval region by using said parameter, when said terminal movement direction and said terminal orientation do not coincide.

5. The information providing system according to claim 1, wherein said specified retrieval region is a region of an ellipsoidal shape with a longer axis in said terminal movement direction, and wherein said region determining section determines said specified retrieval region, to extend an ellipsoidal region in direction of the longer axis based on said terminal movement speed.

6. The information providing system according to claim 5, wherein said region determining section performs a correction of said specified retrieval region to extend a short axis of said ellipsoidal region into a direction of said terminal orientation, when said terminal movement direction and said terminal orientation do not coincide.

7. The information providing system according to claim 1, wherein said specified retrieval region is a region of a fan shape which has an angle with a central line in said terminal movement direction, and wherein said region determining section performs a correction of said fan shape region to extend a radius of said fan shape in response to increase of said movement speed.

8. The information providing system according to claim 7, said region determining section performs a correction of said specified retrieval region such that said angle of said fan shape is widened into said terminal movement direction, when said terminal movement direction and said terminal orientation do not coincide.

9. The information providing system according to claim 1, wherein said position data acquiring section acquires said position data periodically, and wherein said state acquiring section calculates said movement speed and said terminal movement direction based on said position data acquired by said position data acquiring section.

10. The information providing system according to claim 1, further comprising:

a region table in which the retrieval region is stored in relation to said state data, wherein said region determining section extracts said retrieval region based on said state data calculated by said state acquiring section as said specified retrieval region.

11. The information providing system according to claim 1, wherein said region determining section calculates said specified retrieval region by using a preset equation based on said state data.

12. The information providing system according to claim 1, wherein the terminal orientation is determined by a posture of the body of the terminal toward a geometrical coordinate, and wherein the terminal movement direction is calculated based on global positioning data in time-series.

13. The information providing system according to claim 1, wherein the terminal orientation is determined by an orientation of the body of the terminal with respect to a geometrical coordinate, and wherein the terminal movement direction is determined based on a change in global position.

14. An information providing method in an information providing system comprising a terminal and a server, said information providing method comprising:

storing registration data in relation to a position data;

acquiring said position data of said terminal;

acquiring a state data indicative of a state on a movement of said terminal;

determining a specified retrieval region which is changed in response to said state data;

extracting as browser data from said information database, said registration data in which said position data corresponding to said registration data are included in said specified retrieval region;

displaying said browser data; and measuring an orientation of said terminal, wherein said state data further comprises said terminal orientation, wherein said determining enlarges said specified retrieval region in said terminal orientation only when said terminal movement direction and said terminal orientation do not coincide, wherein the terminal orientation comprises information indicating an orientation of a body of the terminal itself, and wherein the terminal movement direction comprises a direction to which the terminal is moving.

15. The information providing method according to claim 14, wherein said state data includes a terminal movement speed and the terminal movement direction, wherein said determining further comprises:

determining said specified retrieval region to extend said specified retrieval region in said terminal movement direction based on said state data.

16. The information providing method according to claim 15, wherein said determining performs a correction of said specified retrieval region based on said state data, to extend said specified retrieval region into a direction of said terminal orientation, when said terminal movement direction and said terminal orientation do not coincide and wherein said determining does not perform a correction of said specified retrieval region based on said state data, to not extend said specified retrieval region into a direction of said terminal orientation, when said terminal movement direction and said terminal orientation coincide.

17. The information providing method according to claim 14, wherein said specified retrieval region is a region of an ellipsoidal shape with a longer axis in said terminal movement direction, and
   wherein said determining comprises:
   determining said specified retrieval region, to extend an ellipsoidal region in direction of the longer axis based on said terminal movement speed.

18. The information providing method according to claim 17, wherein said determining comprises:
   performing a correction of said specified retrieval region to extend a short axis of said ellipsoidal region into a direction of a movement orientation comprising the terminal movement direction, when said terminal movement direction and said terminal orientation do not coincide.

19. The information providing method according to claim 14, wherein said specified retrieval region is a region of a fan shape which has an angle with a central line in said terminal movement direction, and
   wherein said determining comprises:
   performing a correction of said fan shape region to extend a radius of said fan shape in response to increase of said movement speed.

20. The information providing method according to claim 19, wherein said determining comprises:
   performing a correction of said specified retrieval region such that said angle of said fan shape is widened into said terminal movement direction, when said terminal movement direction and said terminal orientation do not coincide.

21. The information providing method according to claim 14, wherein said position data acquiring section acquires said position data periodically, and
   wherein said state acquiring section calculates said movement speed and said terminal movement direction based on said position data acquired by said position data acquiring section.

22. A server connected with a terminal through a network, comprising:
   an information database configured to record registration data in relation to a position data indicative of a position of said terminal from a GPS (global positioning system) satellite;
   a control section configured of a CPU (central processing unit), the control section comprising:
      a state acquiring section configured to acquire a state data indicative of a state of said terminal;
      a region determining section configured to determine a specified retrieval region of said registration data based on said state data; and
      an information extracting section configured to extract said registration data in said specified retrieval region from said information database as a browser data such that said browser data is displayed on said terminal,
   wherein said state data comprises a terminal orientation and a terminal movement direction,
   wherein said region determining section enlarges said specified retrieval region in said terminal orientation only when said terminal movement direction and said terminal orientation do not coincide,
   wherein the terminal orientation comprises information indicating an orientation of a body of the terminal itself, and
   wherein the terminal movement direction comprises a direction to which the terminal is moving.

* * * * *